US006902211B2

(12) United States Patent
Wirth, Jr. et al.

(10) Patent No.: US 6,902,211 B2
(45) Date of Patent: Jun. 7, 2005

(54) QUICK CONNECT/DISCONNECT COUPLING

(75) Inventors: John Wirth, Jr., Dubois, WY (US); Jay L. Sanger, Casper, WY (US); Mark K. McCool, Casper, WY (US); Paul Brutsman, Casper, WY (US); Dan Stoops, Casper, WY (US)

(73) Assignee: Woodworker's Supply Inc., Casper, WY (US)

( * ) Notice: Subject to any disclaimer, the term of this patent is extended or adjusted under 35 U.S.C. 154(b) by 0 days.

(21) Appl. No.: 10/443,109

(22) Filed: May 22, 2003

(65) Prior Publication Data

US 2004/0232695 A1 Nov. 25, 2004

(51) Int. Cl.[7] ............................................. F16L 21/00
(52) U.S. Cl. ...................... 285/402; 285/7; 285/396; 285/314
(58) Field of Search ........................ 285/7, 314, 396, 285/402

(56) References Cited

U.S. PATENT DOCUMENTS

| | | | | |
|---|---|---|---|---|
| 24,100 A | * | 5/1859 | Chamberlin | 285/402 |
| 28,694 A | * | 6/1860 | Smith | 239/589 |
| 830,907 A | * | 9/1906 | Lund | 285/87 |
| 2,076,918 A | * | 4/1937 | Robison | 285/82 |
| 2,103,050 A | * | 12/1937 | White | 285/7 |
| 2,142,149 A | * | 1/1939 | Replogle | 285/7 |
| 2,913,260 A | * | 11/1959 | Givens | 285/151.1 |
| 3,314,039 A | * | 4/1967 | Opper | 439/195 |
| 3,596,936 A | * | 8/1971 | Dieckmann et al. | 285/222.1 |
| 3,674,287 A | * | 7/1972 | Selley | 285/7 |
| 4,306,743 A | * | 12/1981 | Hinshaw et al. | 285/260 |
| 4,328,798 A | | 5/1982 | Isaacson | |
| 4,553,587 A | * | 11/1985 | Traylor | 165/95 |
| 4,688,833 A | * | 8/1987 | Todd | 285/148.14 |
| 4,708,370 A | * | 11/1987 | Todd | 285/12 |
| 4,934,743 A | * | 6/1990 | Kapgan et al. | 285/23 |
| 5,149,149 A | * | 9/1992 | Wu | 285/402 |
| 5,303,504 A | * | 4/1994 | Buzzell | 47/52 |
| 5,667,251 A | * | 9/1997 | Prest | 285/12 |
| 5,921,586 A | * | 7/1999 | Prassas et al. | 285/12 |
| 2003/0034651 A1 | * | 2/2003 | Neubauer et al. | 285/396 |

* cited by examiner

*Primary Examiner*—James M. Hewitt
(74) *Attorney, Agent, or Firm*—Nixon & Vanderhye PC

(57) ABSTRACT

A quick connect/disconnect coupling that eliminates the need for tools and the tedious loosening and tightening of hose clamps when detaching and reattaching hoses, such as dust collection system hoses, between machines. The coupling includes a first fitting adapted to be secured to a machine such as a debris generating machine or a dust collector, and a second fitting fixedly secured to a longitudinal end of the associated hose for being partially engaged with and locked to the first fitting. The fittings are preferably translucent or clear so that debris flow can be observed.

2 Claims, 4 Drawing Sheets

QUICK CONNECT/DISCONNECT COUPLING

BACKGROUND OF THE INVENTION

The present invention relates to fittings and more particularly, to quick connect/disconnect fittings for coupling a hose to a machine.

Dust collection systems are conventionally used in commercial and home hobbyist workshops alike to collect dust and debris generated during cutting, sanding, shaping, and drilling operations. Typically, a hose is clamped at one end to an outlet fitting provided on the cutting, sanding, shaping, or drilling machine and at the other end to the suction inlet port of the dust collector. When the tool operator wishes to disconnect the dust collector and/or use another machine, he must undergo the tedious task of loosening the hose clamp holding the hose to the machine and reattaching the hose and clamp to another machine. Not only is the loosening and the retightening of the associated hose clamps tedious, but tools are required, further delaying the worker's progress.

SUMMARY OF THE INVENTION

It would be desirable to provide a coupling assembly, particularly to coupling a debris generating machine to a debris collector, that allows the associated hose or debris conduit to be quickly connected to and disconnected from a respective machine and/or from the debris collector for cleaning and storage.

The present invention provides a quick connect/disconnect coupling that completely eliminates the need for tools and the tedious loosening and tightening of hose clamps when detaching and reattaching hoses, such as dust collection system hoses, between machines. The coupling provided in accordance with the invention includes a first fitting adapted to be secured to a machine such as a debris generating machine or a dust collector, and a second fitting fixedly secured to a longitudinal end of the associated hose for being partially engaged with and locked to the first fitting. In an exemplary embodiment, one of the fittings is a female fitting and the other is a male fitting for being partly inserted in the female fitting. Most preferably, the first fitting is a female fitting and the second fitting is a male fitting. By providing male and female fittings coupled respectively to the machine and the hose and which may be quickly detachably locked together, hose detachment and reattachment can be effected quickly and easily and without the use of tools.

In a preferred embodiment of the invention, at least one and preferably both of the fittings are at least translucent and more preferably transparent to allow visual confirmation of the movement of debris or other materials between the hose and the associated machine. Also, in a preferred embodiment of the invention, the male fitting has a tapered distal end and the female fitting has a complimentarily tapered proximal end. The complementary tapers serve to prevent undesirable vacuum leaks.

Thus, the invention is embodied in a coupling assembly comprising: a female fitting including a generally cylindrical proximal portion and a generally cylindrical distal portion, said proximal portion having a tapered inner surface that tapers from a first diameter adjacent a proximal end thereof to a second diameter less than said first diameter thereof; a male fitting including a generally cylindrical proximal portion and a generally cylindrical distal portion, said distal portion of said male fitting having a tapered exterior surface tapering from a first diameter adjacent a proximal end thereof to a second diameter adjacent a distal end thereof, said first diameter generally corresponding to said first diameter of said tapered inner surface of said female fitting and said second diameter generally corresponding to said second diameter of said tapered inner surface of said female fitting so that the respective tapered surfaces substantially sealingly engage when said male fitting is inserted axially into said female fitting; one of said fittings further including a radially projecting pin element sized to slidably engage a corresponding groove or slot defined in the other of said fittings.

The invention is also embodied in a coupling assembly comprising: a female fitting including a generally cylindrical proximal portion and a generally cylindrical distal portion; a male fitting including a generally cylindrical proximal portion and a generally cylindrical distal portion; one of said fittings further including a radially projecting pin element sized to slidably engage a corresponding groove or slot defined in the other of said fittings; and at least one of said fittings is at least one of transparent and translucent, at least in part.

The invention may also be embodied in a method of coupling a woodworking machine to a debris collector comprising: providing a first female fitting including a generally cylindrical proximal portion and a generally cylindrical distal portion, said proximal portion having a tapered inner surface that tapers from a first diameter adjacent a proximal end thereof to a second diameter less than said first diameter thereof; providing a debris conducting hose having first and second longitudinal ends; securing said first female fitting to one of an inlet port of said debris collector and said first longitudinal end of said debris conducting hose; providing a first male fitting including a generally cylindrical proximal portion and a generally cylindrical distal portion, said distal portion of said first male fitting having a tapered exterior surface tapering from a first diameter adjacent a proximal end thereof to a second diameter adjacent a distal end thereof, said first diameter generally corresponding to said first diameter of said tapered inner surface of said first female fitting and said second diameter generally corresponding to said second diameter of said tapered inner surface of said second female fitting so that the respective tapered surfaces substantially sealingly engage when said first male fitting is inserted axially into said first female fitting; securing said first male fitting to the other of said inlet port of said debris collector and said first longitudinal end of said debris conducting hose; one of said first male and female fittings further including a radially projecting pin element sized to slidably engage a corresponding groove or slot defined in the other of said first male and female fittings; aligning said pin and said groove or slot and inserting said first male fitting into said first female fitting to couple said first longitudinal end of said debris conducting hose to said debris collector; providing a second female fitting including a generally cylindrical proximal portion and a generally cylindrical distal portion, said proximal portion having a tapered inner surface that tapers from a first diameter adjacent a proximal end thereof to a second diameter less than said first diameter thereof; securing said second female fitting to one of an outlet port of said woodworking machine and said second longitudinal end of said debris conducting hose; providing a second male fitting including a generally cylindrical proximal portion and a generally cylindrical distal portion, said distal portion of said second male fitting having a tapered exterior surface tapering from a first diameter adjacent a proximal end thereof to a second diameter adjacent a distal end thereof, said first diameter generally corresponding to said first diameter of said tapered inner surface of said second female fitting and said second diameter generally corresponding to said second diameter of said tapered inner surface of said second female fitting so that the respective tapered surfaces substantially sealingly engage when said second male fitting is inserted axially into said second female fitting; securing said second male fitting to the other of said outlet port of said woodworking machine and said second longitudinal end of said debris conducting hose; one of said second male and female fittings further including a radially projecting pin element sized to slidably engage a corresponding groove or slot defined in the other of said second male and female fittings; and aligning said pin and said groove or slot of said second fittings and inserting said second male fitting into said second female fitting to couple said second longitudinal end of said debris conducting hose to said woodworking machine.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

The invention will be described hereinbelow with reference to the connection of dust collection hoses respectively to a machine, such as a woodworking machine, and to a dust collector unit. It will be understood, however, that the invention is not limited to use for connecting dust collectors to machines and may be adapted to other environments wherein quick axial coupling is a desirable attribute. Thus, the description hereinbelow with specific reference to the interconnection of a woodworking machine to a dust collector is not to be limiting of the scope of the invention except as may be required by the appended claims.

Figure 1:
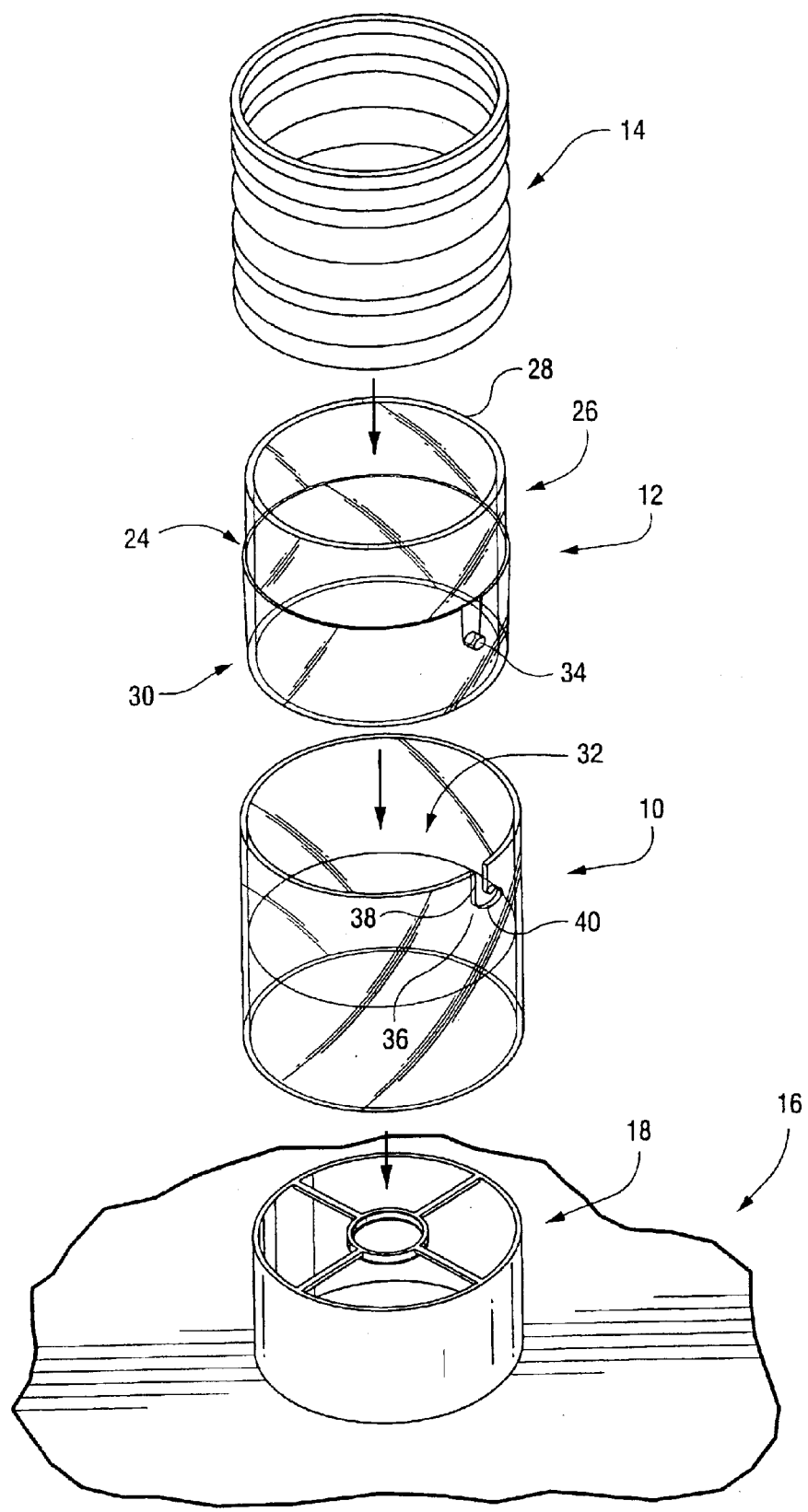
FIG. 1 is an exploded perspective view of a coupling embodying the invention disposed intermediate a dust collector and dust collector hose.

The invention provides a coupling comprised of complementary fittings, e.g., a male fitting and a female fitting for coupling a hose to e.g., a machine. FIG. 1 illustrates fittings 10, 12 embodying the invention interposed between a hose 14 and a dust collector 16. As is conventional, in the illustrated assembly the dust collector includes an inlet comprising an attachment tube 18 to which a hose is typically directly attached using a hose clamp. Rather than directly attaching the hose 14, in accordance with the invention, a first fitting 10 is secured to the dust collector inlet and second fitting 12, complementary to the first fitting, is connected to the longitudinal end of the hose 14. In the illustrated embodiment, the first fitting is a female fitting and the second fitting is a male fitting. It is to be understood, however, that the male fitting may be attached to the dust collector and/or machine and the female fitting may be attached to the longitudinal end(s) of the hose. Thus, the illustrated embodiment is a non-limiting example of the implementation of the invention in this regard.

Figure 2:
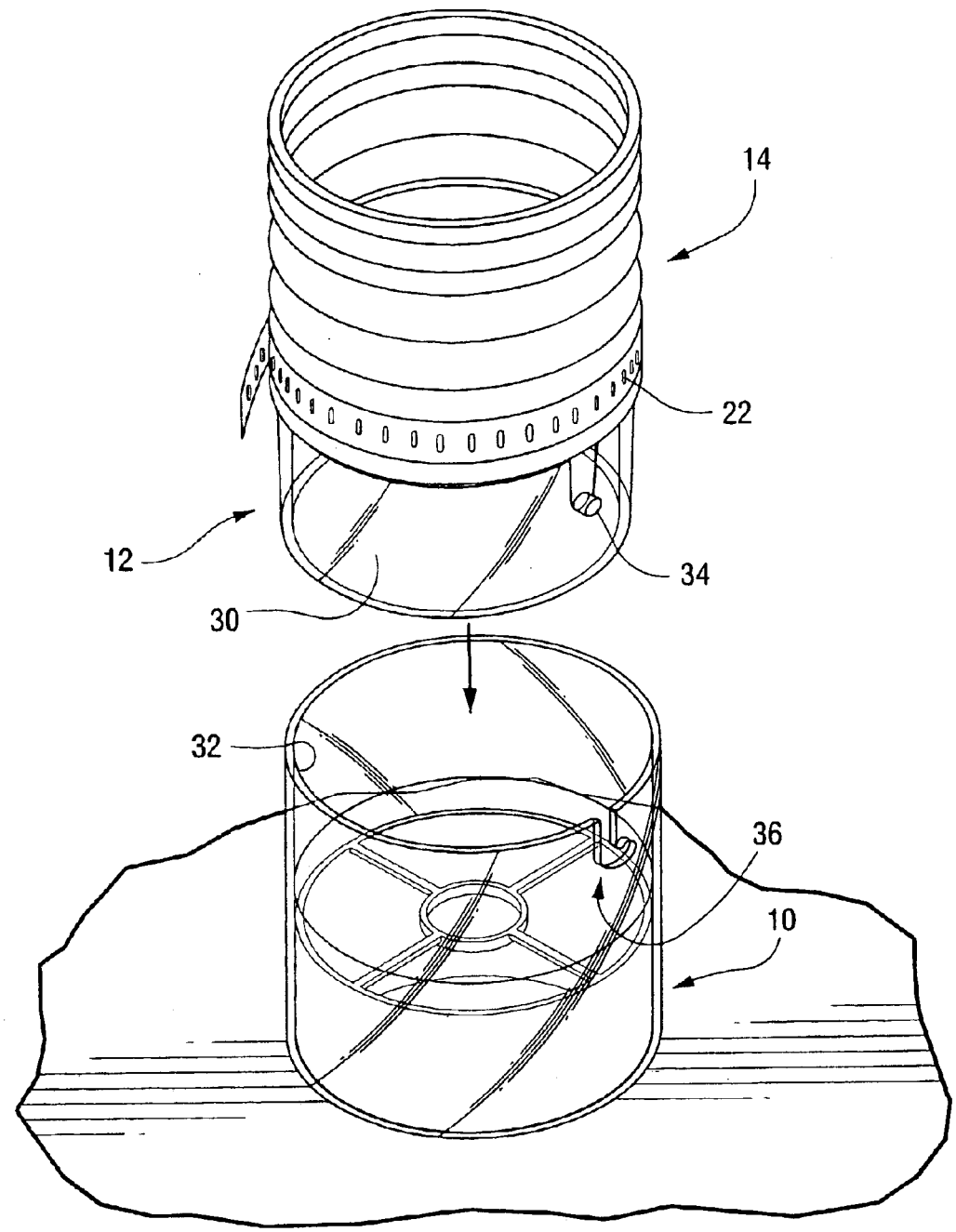
FIG. 2 is an exploded perspective view showing fittings embodying the invention assembled and aligned for connection.
Figure 3:
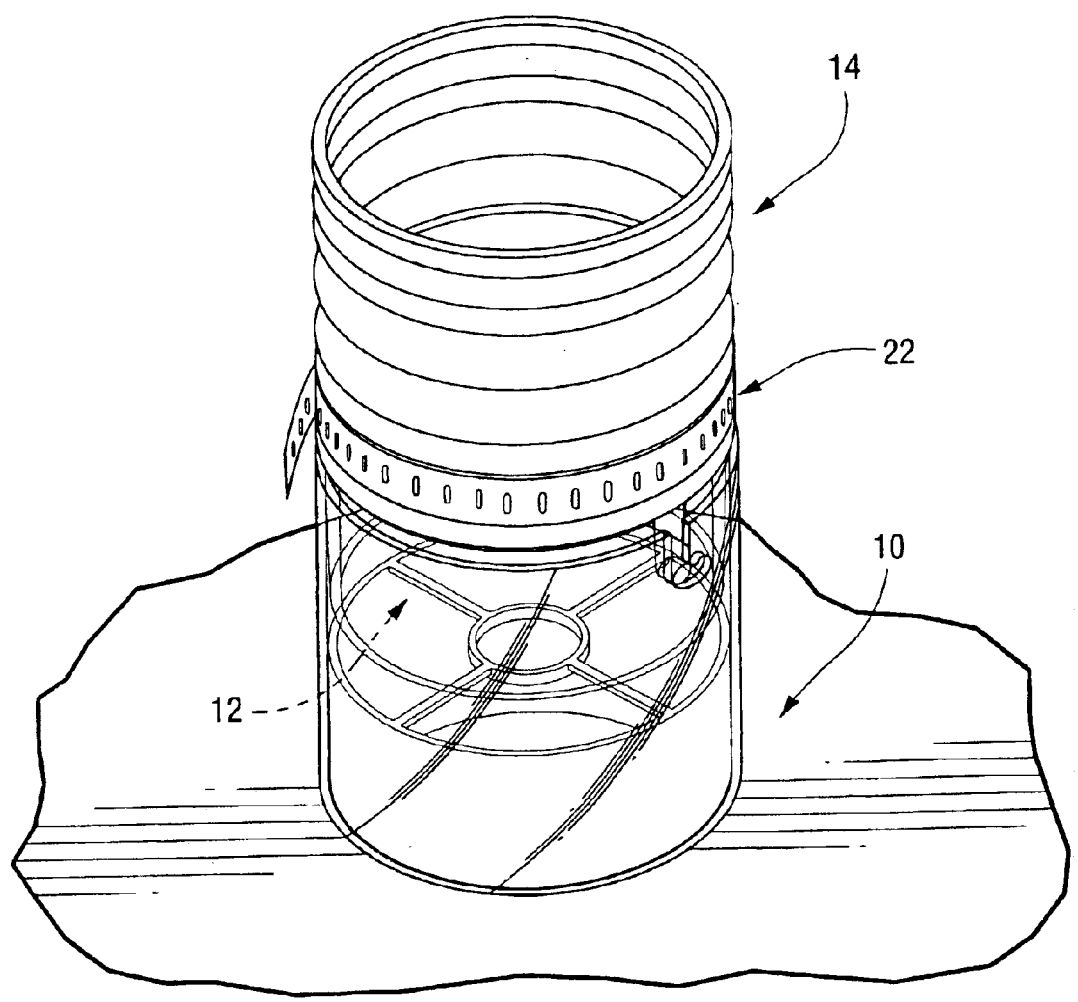
FIG. 3 is a perspective view illustrating the fittings of FIG. 2 in their connected disposition.

The first fitting 10 may be connected and secured to the dust collector inlet 18 in any suitable manner. By way of example, the structures can be respectively configured to define a threaded coupling, an axial snap lock coupling, or a silicone adhesive material may be applied to adhere the fitting to the dust collector inlet. In the illustrated and presently preferred embodiment, a hole is preformed or predrilled through the female fitting for receiving a set screw or bolt 20 (FIG. 4) to lock the fitting to the dust collector inlet to form the assembly shown in FIG. 2. The second fitting 12 is in turn coupled to the dust collector hose 14. In the illustrated embodiment, the hose is simply slipped onto the proximal end of the fitting 12 and secured thereto with a hose clamp 22, as illustrated in FIG. 2. In the illustrated embodiment, a shoulder 24 is defined on the outer circumference of the second fitting 12, as described in greater detail below, to define a hose connection portion 26. If deemed necessary or desirable, a flange (not shown) may be defined adjacent the proximal end 28 of the second fitting 12 to in effect define a circumferential groove between the flange and the shoulder for preventing the clamped hose from unintentionally axially slipping off the second fitting.

As can also be seen in FIGS. 1 and 2, the distal portion 30 of the male fitting and the proximal portion 32 of the female fitting are respectively tapered to define a complementary tapered fit. The matched tapered seating of the fittings prevents vacuum leaks when the fittings are engaged and locked.

As noted above, the fittings 10,12 are advantageously configured for quick locking and unlocking. To that end, a pin 34 projects radially from the outer surface of the male fitting and a complementary groove or slot 36 is defined in the female fitting for receiving the pin. As illustrated in FIG. 1, the slot for receiving the pin includes an axial portion 38 and a generally part circumferential portion 40 so as to be generally "L" or "J" shaped.

In a preferred embodiment, the fittings are formed, at least in part and preferably entirely, from a durable, transparent or translucent plastic. The fittings are most preferably formed from clear plastic. Providing transparent or translucent fittings according to this embodiment, makes it possible to view the flow of debris to/from the associated machine and to allow for hose adjustments to ensure maximum efficiency. In an exemplary embodiment, the fittings are sized to fit 4 inch dust ports. It being appreciated that fitting sizes can be varied to accommodate the hoses and/or machinery with which they are used.

Figure 4:
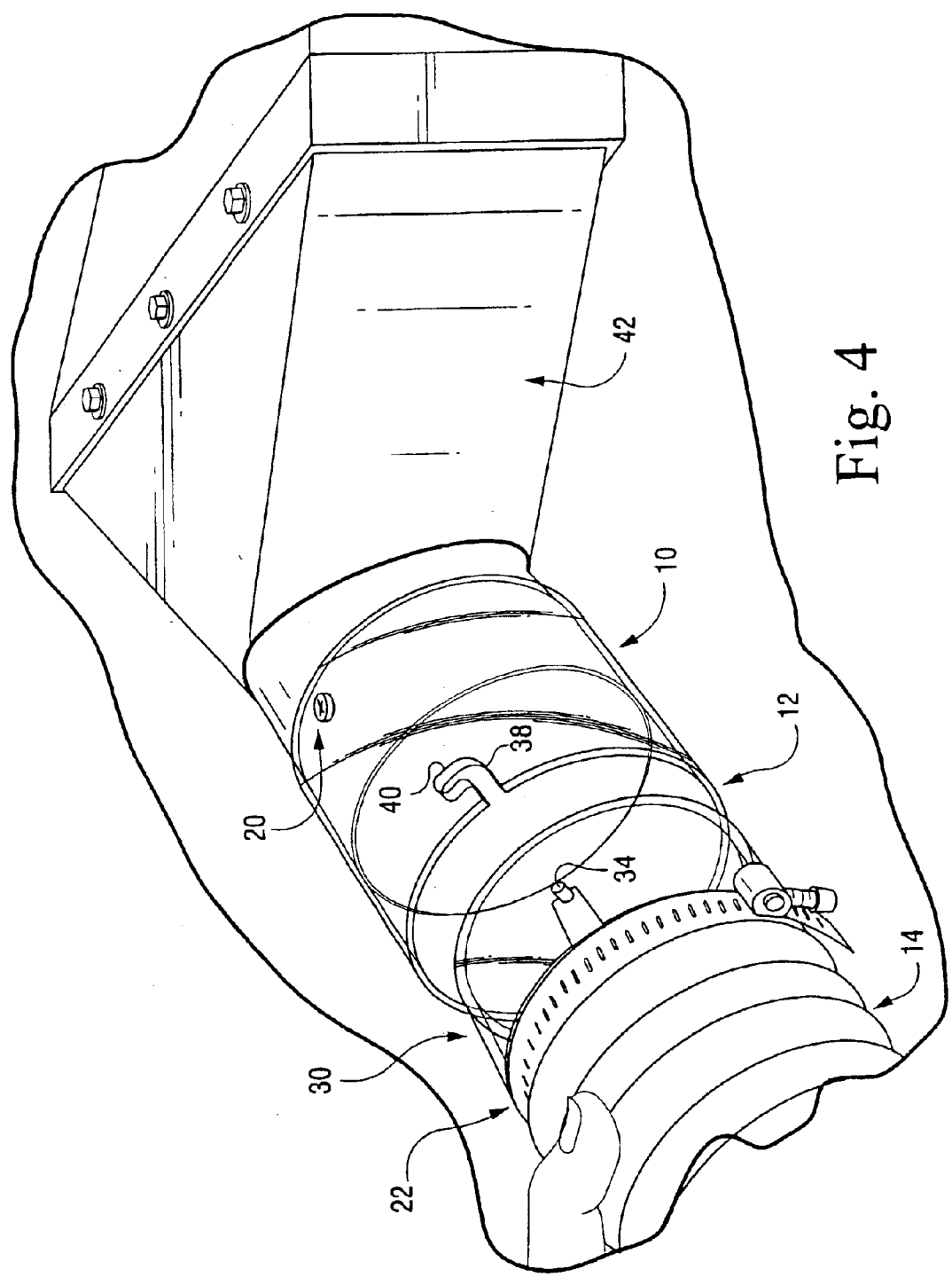
FIG. 4 is a schematic illustration of a fitting embodying the invention coupled to a machine and aligned to receive and engage a fitting embodying the invention coupled to an associated hose.

FIG. 4 illustrates a female fitting 10 attached to a woodworking machine, such as a planer 42, which generates debris during operation. According to the invention, a male fitting 12 that is suitably coupled to a dust collection hose 14 may be aligned with the female fitting, inserted and then rotated, e.g., clockwise, to lock the fittings 10, 12 together. When the fitting is to be disengaged from the machine and attached to another machine or stored, the fitting is simply rotated, e.g., counterclockwise, and displaced axially to separate the dust collection hose from the machine.

It will be appreciated that the invention provides a coupling assembly that may be quickly and easily engaged and disengaged as needed so that the worker may more efficiently use and collect debris from various machines with minimum preparation and tear down time. Moreover, the clear or translucent fittings enable confirmation of coupling and operation of the system.

It is to be understood that while the invention has been described in connection with a first, e.g., female fitting that is formed separately from and connected to an associated machine, it is to be understood that a dust collector or woodworking machine can be configured to have its respective inlet/outlet portions configured to mate with a complementary fitting provided in accordance with the invention. Therefore, the invention is not to be limited to a fitting formed separately from the associated component or machine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of coupling a woodworking machine to a debris collector comprising:

providing a first female fitting including a generally cylindrical proximal portion and a generally cylindrical distal portion, said proximal portion having a tapered inner surface that tapers from a first diameter adjacent a proximal end thereof to a second diameter less than said first diameter thereof;

providing a debris conducting hose having first and second longitudinal ends;

securing said first female fitting to one of an inlet port of said debris collector and said first longitudinal end of said debris conducting hose;

providing a first male fitting including a generally cylindrical proximal portion and a generally cylindrical distal portion, said distal portion of said first male fitting having a tapered exterior surface tapering from a first diameter adjacent a proximal end thereof to a second diameter adjacent a distal end thereof, said first diameter generally corresponding to said first diameter of said tapered inner surface of said first female fitting and said second diameter generally corresponding to said second diameter of said tapered inner surface of said second female fitting so that the respective tapered surfaces substantially sealingly engage when said first male fitting is inserted axially into said first female fitting;

securing said first male fitting to the other of said inlet port of said debris collector and said first longitudinal end of said debris conducting hose;

one of said first male and female fittings further including a radially projecting pin element sized to slidably engage a corresponding groove or slot defined in the other of said first male and female fittings;

aligning said pin and said groove or slot and inserting said first mate fitting into said first female fitting to couple said first longitudinal end of said debris conducting hose to said debris collector;

providing a second female fitting including a generally cylindrical proximal portion and a generally cylindrical distal portion, said proximal portion having a tapered inner surface that tapers from a first diameter adjacent a proximal end thereof to a second diameter less than said first diameter thereof;

securing said second female fitting to one of an outlet port of said woodworking machine and said second longitudinal end of said debris conducting hose;

providing a second male fitting including a generally cylindrical proximal portion and a generally cylindrical distal portion, said distal portion of said second male fitting having a tapered exterior surface tapering from a first diameter adjacent a proximal end thereof to a second diameter adjacent a distal end thereof, said first diameter generally corresponding to said first diameter of said tapered inner surface of said second female fitting and said second diameter generally corresponding to said second diameter of said tapered inner surface of said second female fitting so that the respective tapered surfaces substantially sealingly engage when said second male fitting is inserted axially into said second female fitting;

securing said second male fitting to the other of said outlet port of said woodworking machine and said second longitudinal end of said debris conducting hose;

one of said second male and female fittings further including a radially projecting pin element sized to slidably engage a corresponding groove or slot defined in the other of said second male and female fittings; and aligning said pin and said groove or slot of said second fittings and inserting said second male fitting into said second female fitting to couple said second longitudinal end of said debris conducting hose to said woodworking machine.

2. A method as in claim 1, wherein at least one of said fittings is transparent or translucent, at least in part, and further comprising observing a flow of debris through said at least one fitting.

* * * * *